(12) United States Patent
Sriram (10) Patent No.: US 11,899,750 B2
(45) Date of Patent: Feb. 13, 2024

(54) QUANTILE NEURAL NETWORK

(71) Applicant: Ford Global Technologies, LLC, Dearborn, MI (US)

(72) Inventor: Venkatesh Sriram, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 428 days.

(21) Appl. No.: 17/242,490

(22) Filed: Apr. 28, 2021

(65) Prior Publication Data

US 2022/0366186 A1    Nov. 17, 2022

(51) Int. Cl.
*G06N 3/08* (2023.01)
*G06F 18/214* (2023.01)
*G06N 3/04* (2023.01)
*G05D 1/00* (2006.01)
*G06V 20/56* (2022.01)
*G06F 18/40* (2023.01)

(52) U.S. Cl.
CPC ......... *G06F 18/214* (2023.01); *G05D 1/0221* (2013.01); *G05D 1/0246* (2013.01); *G06F 18/41* (2023.01); *G06N 3/04* (2013.01); *G06N 3/08* (2013.01); *G06V 20/56* (2022.01)

(58) Field of Classification Search
CPC ..... G06F 18/214; G06F 18/41; G05D 1/0221; G05D 1/0246; G06N 3/04; G06N 3/08; G06N 3/0464; G06N 3/084; G06N 3/082; G06N 3/063; G06N 5/041; G06V 20/56; G06V 10/82; G06V 20/58

USPC .......................................................... 382/104
See application file for complete search history.

(56) References Cited

U.S. PATENT DOCUMENTS

2019/0258878 A1   8/2019   Koivisto et al.
2020/0133281 A1   4/2020   Gomez Gutierrez et al.
2020/0249677 A1   8/2020   Maat et al.

FOREIGN PATENT DOCUMENTS

EP    3614313 A1    2/2020

OTHER PUBLICATIONS

DeVries et al., "Learning Confidence for Out-of-Distribution Detection in Neural Networks", arXiv:1802.04865v1, Feb. 13, 2018.

*Primary Examiner* — Charlotte M Baker
(74) *Attorney, Agent, or Firm* — Brandon Hicks; Bejin Bieneman PLC (57) ABSTRACT

A computer, including a processor and a memory, the memory including instructions to be executed by the processor to train a quantile neural network to input an image and output a lower quantile (LQ) prediction, a median quantile (MQ) prediction and an upper quantile (UQ) prediction corresponding to an object in the image, wherein an LQ loss, an MQ loss and a UQ loss are determined for the LQ prediction, the MQ prediction and the UQ prediction respectively and wherein the LQ loss, the MQ loss and the UQ loss are combined to form a base layer loss and output the quantile neural network.

20 Claims, 8 Drawing Sheets

Fig. 8 ural Network

QUANTILE NEURAL NETWORK

BACKGROUND

Image sensors can be provided in various systems to facilitate object detection. For example, machine learning techniques can be used to detect objects in images that can then be used to operate a machine such as a robot, a vehicle, etc. For example, computing devices included in a robot or a vehicle can be equipped with to acquire and/or process image data regarding an environment and to make decisions based on analyzing the image data to detecting objects. However, image analysis to provide object detection can be computationally expensive, i.e., can consume large amounts of computer processing resources, and in addition can consume large amounts of computer memory.

DETAILED DESCRIPTION

A computing device in a machine or system such as a vehicle, a robot, a manufacturing machine or medical scanner can be programmed to detect objects and regions based on image data acquired by a sensor included in the system. For example, data regarding an environment around a vehicle can include the location(s) of one or more objects such as other vehicles and pedestrians, etc., and can be used by a computing device in the vehicle to operate the vehicle. A computing device in a vehicle can also acquire data regarding the operation of the vehicle from sensors included in the vehicle for vehicle diagnostics, vehicle analytics or other vehicle data collection purposes. Vehicle diagnostics are computer-based techniques for determining causes for faulty or sub-optimal operation of the vehicle. Vehicle analytics are computer-based techniques for determining patterns in normal operation of the vehicle. Other vehicle data can be collected to predict vehicle service interval, for example.

Data regarding a part within the reach of a robot can be used to direct the robot to pick the part up, for example. Data regarding an assembled product can be used by a manufacturing system to determine whether the product has been assembled correctly. Data regarding a medical scan such as a computerized tomography (CT) or magnetic resonance imaging (MRI) image can be analyzed to detect pathology that can be communicated to a medical doctor for treatment. The computing device can include a neural network trained to detect objects in image data. Detecting objects in the context of this document means determining labels and locations of objects in image data. An object label includes an identifier (typically a unique identifier) for an object such as a text string that identifies the object. An object in the context of this document means a physical item that occupies three dimensions, e.g., a vehicle or a vehicle trailer, for example. In other examples, the object can be a manufactured part, an assembled product or a human organ. Detecting an object in an image can include determining relationships between objects such as an angle that a vehicle trailer makes with the vehicle, determining a location of an object with respect to a robot gripper, determining a relationship between parts in an assembled product or determining whether a human organ is of a size, shape and location corresponding to a healthy organ. A neural network is typically implemented as a computer software program that can be trained to detect objects in image data using training datasets that include images with examples of objects and regions and corresponding ground truth that identifies the objects and regions. Ground truth is data regarding the object that is obtained from a source independent from the neural network. Ground truth data is data determined or deemed to correspond to, i.e., represent, actual real world conditions or states. For example, ground truth regarding the objects can be obtained by having human observers view the images and determine object labels and locations.

Deep neural networks (DNNs) are artificial intelligence technologies that are used in image sensor-based machine learning systems for sensing and control applications. Computing devices included in a robot or a vehicle can be equipped with one or more DNNs to acquire and process image data regarding an environment and to make decisions based on DNN predictions such as object detection. Machine learning systems, including DNNs, can be programmed or trained to input image data and output predictions regarding object labels and locations. In some examples, the predictions from DNNs are not always accurate and reliable. For example, predictions for new data which was not included in network training tend to have errors because the trained DNN models lack knowledge about them. In other examples outlier data generated due to noise factors can cause prediction errors which can be identified in the output data. In both of these examples, using an erroneous prediction from a DNN can lead to degraded system performance. Techniques discussed herein can improve DNNs by generating a model prediction confidence signal to improve the performance of DNNs using real world data.

Techniques discussed herein program or train DNNs to output one or more confidence or uncertainty values that correspond to a probability that the prediction output by the system is correct. This confidence can be used by a decision controller to determine whether to reject or use the machine-learning model prediction by the system. Such confidence would help in taking safety actions by switching off industrial robots or autonomous vehicles enabled by AI systems, for example. For example, a vehicle or mobile robot can be operated based on predicted locations of objects in an environment around the vehicle. A robot can be directed to move a gripper to a location based on determining that no objects block the predicted motion of the gripper. Both false positive and false negative predictions regarding pathology detection in a medical scan can have adverse effects. Outputting an uncertainty corresponding to a prediction can permit a computing device to determine whether to operate a vehicle, a robot, ship a product or recommend treatment based on the output prediction.

Techniques discussed herein determine object predictions and uncertainty estimates using a quantile deep neural network. A quantile results from dividing a probability distribution into intervals, where each interval or quantile in the distribution has a same total probability. A quantile neural network outputs a prediction, which includes a value to be estimated by the neural network, for example an object's location, size or shape. The prediction output by a quantile neural network corresponds to the most likely prediction expected to result from the input data. The most likely prediction corresponds to the median prediction or minimum mean square error prediction and is referred to herein as a mean square error prediction or just the prediction. A quantile neural network also includes a plurality of quantile outputs corresponding to prediction estimates with greater uncertainty than the most likely or mean square error prediction and are referred to herein as uncertainties or uncertainty predictions. Uncertainty predictions from a quantile deep neural network can correspond to underprediction, where the prediction estimate is determined to be less than expected or overprediction, where the prediction estimate is determined to be greater than expected. The uncertainty predictions, along with the prediction can be processed to yield a confidence level that can be applied to the prediction to determine a level of trust in the prediction. For example, the uncertainties and the prediction can be processed to determine whether the prediction should be regarded as a high confidence prediction, where a subsequent action can be undertaken based on the prediction, or a low confidence prediction, where a subsequent action should not be undertaken based on the prediction.

Machine learning systems like DNNs are also highly data-driven and can benefit from continuous training with new data for performance improvement. DNNs can also benefit from automatically identifying new data from real-world sources such as user vehicles to further improve the models in autonomous vehicles. DNNs can also consume computational resources including computer memory and there is therefore a need to have light-weight approaches which identify new data and enable determination of system confidence. Techniques discussed herein can improve machine learning systems like DNNs by generating confidence values in addition to predictions and thereby identify both new data and outlier data. Techniques discussed herein are light-weight in that they generate confidence values using fewer computing resources than techniques that require multiple models or additional software programs.

Uncertainty in a machine learning system can be divided into two sources of uncertainty: aleatoric uncertainty and epistemic uncertainty. Aleatoric uncertainty means uncertainty about variations in output predictions caused by random variations or noise in the input data. Aleatoric uncertainty assumes that the data input to the machine learning system is similar to data in a training dataset used to train the machine learning system. For example, atmospheric conditions that cause distortions in image data can be regarded as aleatoric uncertainty.

Epistemic uncertainty means uncertainty about variations in output predictions caused by inputting data previously unknown to the machine learning system. Epistemic uncertainty in the variation in output predictions is caused by lack of knowledge regarding the input, as opposed to statistical variation in the input. For example, inputting an image of new type of vehicle trailer that was not included in the training dataset for a deep neural network can be regarded as epistemic uncertainty. Another example of epistemic uncertainty is inputting an image with no vehicle trailer visible and expecting a deep neural network to locate a vehicle trailer.

Techniques discussed herein can determine uncertainties for predictions made by a deep neural network corresponding to both aleatoric and epistemic uncertainty. Previous approaches involve multiple models and multiple inferences on a single sample to produce uncertainty estimates corresponding to predictions. Techniques discussed herein improve deep neural network prediction by estimating uncertainty by training a deep neural network to output predictions and uncertainty estimates using a quantile deep neural network that employs a single model and a single inference per data sample in real time, thereby saving computational resources and physical memory over previous techniques. For example, present techniques have such advantages over techniques for estimating uncertainty related to neural network predictions that add post processing systems, for example Kalman filters, to analyze the predictions output from a neural network. Similar advantages can be obtained from the present disclosure over techniques for determining uncertainty that include training multiple models using drop-out neural networks to process the same data multiple times and then compare the results. These multiple models require multiple complete copies of the neural network. In sum, these other techniques require more computing resources including memory to estimate uncertainties. These approaches also can require multiple training and processing iterations or passes to determine uncertainty, thereby increasing processing time. Techniques disclosed herein are compact, requiring no additional processes to determine uncertainty, and can be trained in one shot, meaning that retraining additional models is not required to estimate uncertainty.

Disclosed herein is a method including training a quantile neural network to input an image and output a lower quantile (LQ) prediction, a median quantile (MQ) prediction and an upper quantile (UQ) prediction corresponding to an object in the image, wherein an LQ loss, an MQ loss and a UQ loss are determined for the LQ prediction, the MQ prediction and the UQ prediction respectively and wherein the LQ loss, the MQ loss and the UQ loss are combined to form a base layer loss and outputting the quantile neural network. The LQ prediction corresponds to a first quantile included in a distribution of output predictions, the MQ prediction corresponds to a second quantile included in the distribution of output predictions and the UQ corresponds to a third quantile included in the distribution of output predictions. The LQ loss, the MQ loss and the UQ loss can be determined by comparing the LQ prediction, the MQ prediction, and the UQ prediction, respectively, to a ground truth value determined based on the image. The LQ loss can be applied to LQ layers of the quantile neural network, the MQ loss can be applied to MQ layers of the quantile neural network and the UQ loss can be applied to UQ layers of the quantile neural network.

The base layer loss can be determined by combining the LQ loss, the MQ loss, and the UQ loss corresponding to a base layer loss function wherein the base layer loss function=a*(LQ loss)+b*(MQ loss)+c*(UQ loss), wherein a, b, and c are user selected constants. The base layer loss function can be applied to base layers of the quantile neural network including convolutional layers and fully connected layers. A confidence level can be determined by comparing a standard deviation of the LQ prediction, the MQ prediction, and the UQ prediction to a user determined threshold. The quantile neural network can be output to a computing device in a vehicle. The vehicle can be operated based on inputting image data to the quantile neural network and receiving an output prediction corresponding to the MQ prediction and the confidence level. The vehicle can be operated by communicating control signals to one or more of a vehicle powertrain controller, a vehicle braking controller, a vehicle steering controller, vehicle diagnostics module, a vehicle analytics module and a vehicle data-collection module. The MQ loss can be based on one or more of a mean square error (MQE), a mean absolute error (MAE), Hinge loss, and Huber loss. Hinge loss can be determined by $\ell$ (y)=max(0,1–t·y). The LQ loss can be based on $$LQ \text{ error} = \max\!\left(\begin{array}{c} LQ*(\log(l1+l2*)), \\ (LQ-1)*(\log(l1+l2*\exp\{l3*MQerror\})) \end{array}\right)\!.$$

The UQ loss can be based on $$UQ \text{ error} = \max\!\left(\begin{array}{c} UQ*(\log(u1+u2*\exp\{u3*MQerror\})), \\ (UQ-1)*(\log(u1+u2*\exp\{u3*MQerror\})) \end{array}\right)\!.$$

Further disclosed is a computer readable medium, storing program instructions for executing some or all of the above method steps. Further disclosed is a computer programmed for executing some or all of the above method steps, including a computer apparatus, programmed to train a quantile neural network to input an image and output a lower quantile (LQ) prediction, a median quantile (MQ) prediction and an upper quantile (UQ) prediction corresponding to an object in the image, wherein an LQ loss, an MQ loss and a UQ loss are determined for the LQ prediction, the MQ prediction and the UQ prediction respectively and wherein the LQ loss, the MQ loss and the UQ loss are combined to form a base layer loss and output the quantile neural network. The LQ prediction corresponds to a first quantile included in a distribution of output predictions, the MQ prediction corresponds to a second quantile included in the distribution of output predictions and the UQ corresponds to a third quantile included in the distribution of output predictions. The LQ loss, the MQ loss and the UQ loss can be determined by comparing the LQ prediction, the MQ prediction, and the UQ prediction, respectively, to a ground truth value determined based on the image. The LQ loss can be applied to LQ layers of the quantile neural network, the MQ loss can be applied to MQ layers of the quantile neural network and the UQ loss can be applied to UQ layers of the quantile neural network.

The computer can be further programmed to determine the base layer loss by combining the LQ loss, the MQ loss, and the UQ loss corresponding to a base layer loss function wherein the base layer loss function=a*(LQ loss)+b*(MQ loss)+c*(UQ loss), wherein a, b, and c are user selected constants. The base layer loss function can be applied to base layers of the quantile neural network including convolutional layers and fully connected layers. A confidence level can be determined by comparing a standard deviation of the LQ prediction, the MQ prediction, and the UQ prediction to a user determined threshold. The quantile neural network can be output to a computing device in a vehicle. The vehicle can be operated based on inputting image data to the quantile neural network and receiving an output prediction corresponding to the MQ prediction and the confidence level. The vehicle can be operated by communicating control signals to one or more of a vehicle powertrain controller, a vehicle braking controller, a vehicle steering controller, vehicle diagnostics module, a vehicle analytics module and a vehicle data-collection module. The MQ loss can be based on one or more of a mean square error (MQE), a mean absolute error (MAE), Hinge loss, and Huber loss. Hinge loss can be determined by $\ell$ (y)=max(0,1–t·y). The LQ loss can be based on $$LQ \text{ error} = \max\!\left(\begin{array}{c} LQ*(\log(l1+l2*)), \\ (LQ-1)*(\log(l1+l2*\exp\{l3*MQerror\})) \end{array}\right)\!.$$

The UQ loss can be based on $$UQ \text{ error} = \max\!\left(\begin{array}{c} UQ*(\log(u1+u2*\exp\{u3*MQerror\})), \\ (UQ-1)*(\log(u1+u2*\exp\{u3*MQerror\})) \end{array}\right)\!.$$

Figure 1:
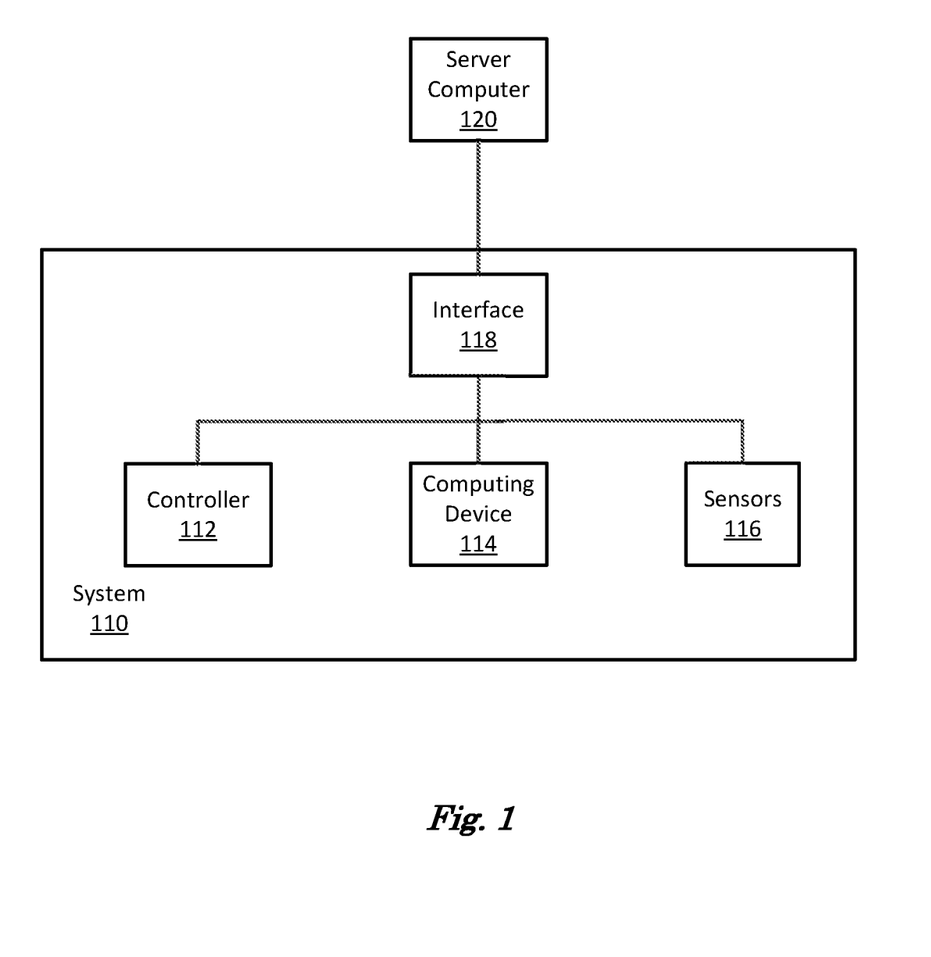
FIG. 1 is a diagram of an example vehicle.
Figure 5:
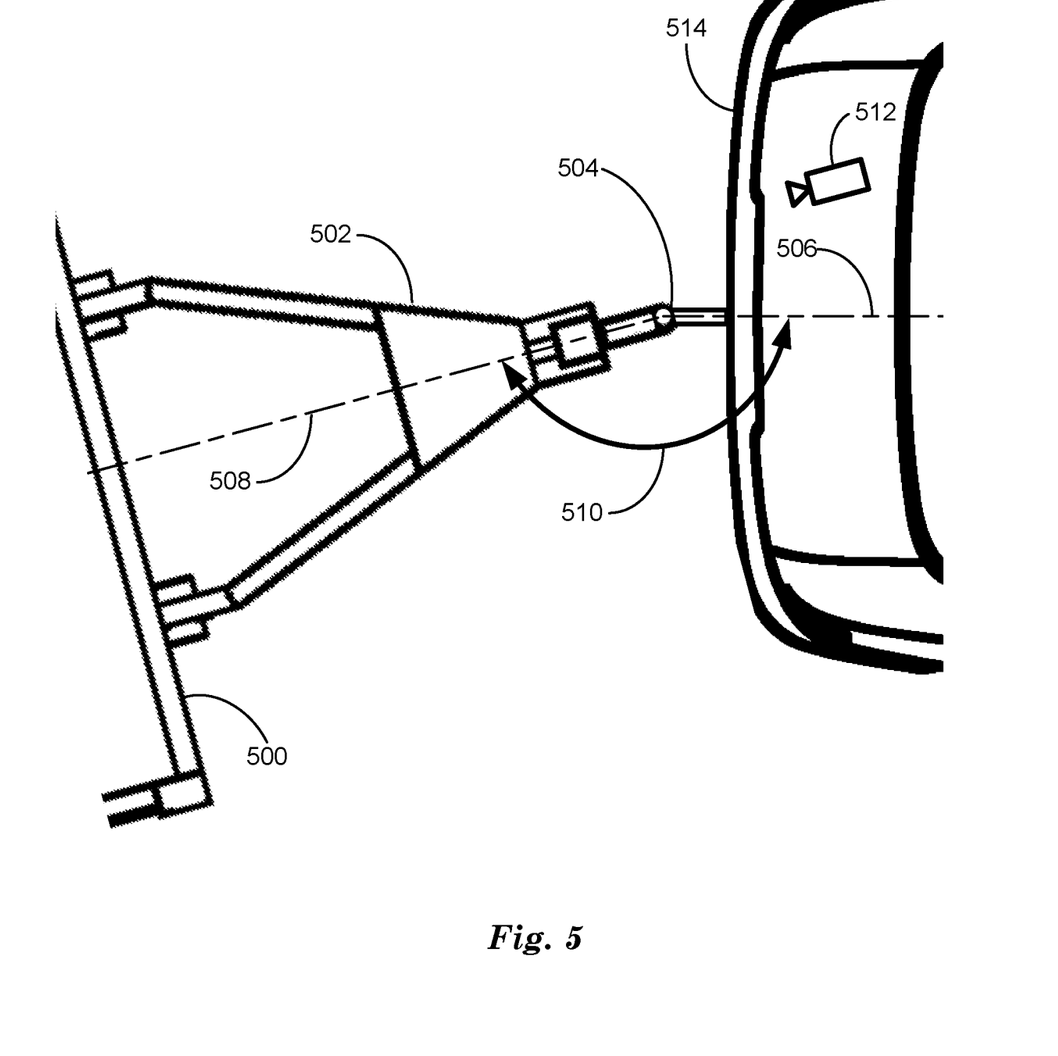
FIG. 5 is a diagram of an example vehicle trailer.

FIG. 1 is a diagram of a system 110 that includes one or more controllers 112, a computing device 114, sensors 116 and an interface 118. The system 110 can be included in a vehicle such as the vehicle 514 that is illustrated in FIG. 5, a robot, or a device such as a manufacturing machine or a medical scanner. The system can include an interface 118 that permits computing device 114 to communicate with a server computer 120, which can be a cloud-based computer. In examples discussed herein, a quantile neural network can be trained on a cloud-based server computer 120 and downloaded to a computing device 114 to operate a system 110. For example, a quantile neural network can be trained on a server computer 120 and downloaded to a system 110 included in a vehicle, robot, or device such as a manufacturing machine or medical scanner.

In examples where system 110 in included in a vehicle, the vehicle can be operable in autonomous ("autonomous" by itself in this disclosure means "fully autonomous"), semi-autonomous, or occupant piloted (also referred to as non-autonomous) mode. By a semi- or fully-autonomous mode, we mean a mode of operation wherein a vehicle can be piloted partly or entirely by a computing device as part of a system having sensors and controllers. In a fully-autonomous mode the vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer. Thus, in a vehicle, one or more system 110 computing devices 114 can receive data regarding the operation of the vehicle from sensors 116. The computing device 114 may operate the vehicle in an autonomous mode, a semi-autonomous mode, or a non-autonomous mode.

The computing device (or computer) 114 includes a processor and a memory such as are known. Further, the memory includes one or more forms of computer-readable media, and stores instructions executable by the processor for performing various operations, including as disclosed herein. For example, the computing device 114 may include programming to operate one or more controllers 112. In examples where the system 110 is included in a vehicle, the controllers 112 can operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computing device 114, as opposed to a human operator, is to control such operations.

In examples discussed herein, the system 110 can be included in a robot, wherein the one or more controllers 112 can control motion of robot components such as robotic arms that include robotic actuators such as grippers, etc. Computing device 114 can acquire and process data from sensors 116 to determine data that can be used to control robot components such as arms and grippers to manipulate objects and tools and thereby accomplish tasks. System 110 can also be included in or with devices such as manufacturing machines or medical scanners where computing device 114 can use one or more controllers 112 and sensors 116 to acquire data. The controllers 112 can control system 110 components to move parts or humans in the field of view of sensors 116 to acquire data and control system 110 components to generate signals used to acquire data, for example X-rays, magnetic fields, or ultrasound waves. Sensors 116 can include visible light and infrared cameras, ultrasound detectors, radio wave detectors, X-ray detectors, and gamma ray detectors.

The computing device 114 may include or be communicatively coupled to, e.g., via a vehicle communications bus as described further below, more than one computing devices, e.g., controllers or the like included in the system 110 for monitoring and/or controlling various system components. In examples where the system 110 is included in a vehicle the one or more controllers 112 can include, e.g., a powertrain controller 112, a brake controller 112, a steering controller 112, etc. The computing device 114 is generally arranged for communications on a system communication network, e.g., including a bus in the system 110 such as a controller area network (CAN) or the like; the system 110 network can additionally or alternatively include wired or wireless communication mechanisms such as are known, e.g., Ethernet or other communication protocols.

Via the system network, the computing device 114 may transmit messages to various devices in the system and/or receive messages from the various devices, e.g., controllers, actuators, sensors, etc., including sensors 116. Alternatively, or additionally, in cases where the computing device 114 actually comprises multiple devices, the vehicle communication network may be used for communications between devices represented as the computing device 114 in this disclosure. Further, as mentioned below, various controllers or sensing elements such as sensors 116 may provide data to the computing device 114 via the system communication network.

In addition, the computing device 114 may be configured for communicating through an interface 118 with a remote server computer 120, e.g., a cloud server, via a network, which, as described below, includes hardware, firmware, and software that permits computing device 114 to communicate with a remote server computer via a network such as wireless Internet (WI-FI®) or cellular networks. Interface 118 may accordingly include processors, memory, transceivers, etc., configured to utilize various wired and/or wireless networking technologies, e.g., cellular, BLUETOOTH® and wired and/or wireless packet networks. Computing device 114 may be configured for communicating with other systems 110 through interface 118 using networks, e.g., according to Dedicated Short Range Communications (DSRC) and/or the like, e.g., formed on an ad hoc basis among nearby systems 110 or formed through infrastructure-based networks. The computing device 114 also includes nonvolatile memory such as is known. Computing device 114 can log data by storing the data in nonvolatile memory for later retrieval and transmittal via an interface 118 to a server computer or mobile device such as a smart phone.

As already mentioned, generally included in instructions stored in the memory and executable by the processor of the computing device 114 is programming for operating one or more system 110 components, e.g., braking, steering, propulsion, etc., without intervention of a human operator. Using data received in the computing device 114, e.g., the sensor data from the sensors 116, the server computer, etc., the computing device 114 may make various determinations and/or control various vehicle components and/or operations without a driver to operate the vehicle. For example, the computing device 114 may include programming to regulate system 110 operational behaviors (i.e., physical manifestations of system 110 operation). For a system 110 included in a vehicle operational behaviors include such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection. For a robot operational behaviors typically include end effector trajectory, speed, acceleration, and deceleration, etc.

The one or more controllers 112 for a system 110 included in a vehicle may include conventional electronic control units (ECUs) or the like including, as non-limiting examples, one or more powertrain controllers, one or more brake controllers, and one or more steering controllers. Each of the controllers 112 may include respective processors and memories and one or more actuators. The controllers 112 may be programmed and connected to a system 110 communications bus, such as a controller area network (CAN) bus or local interconnect network (LIN) bus, to receive instructions from the computing device 114 and control actuators based on the instructions.

Sensors 116 may include a variety of devices known to provide data via the system 110 communications bus. For example, a radar fixed to a front bumper (not shown) of a vehicle may provide a distance from the vehicle to a next vehicle in front of the vehicle, or a global positioning system (GPS) sensor disposed in the vehicle may provide geographical coordinates of the vehicle. The distance(s) provided by the radar and/or other sensors 116 and/or the geographical coordinates provided by the GPS sensor may be used by the computing device 114 to operate the vehicle autonomously or semi-autonomously, for example.

Referring now to FIG. 5, the vehicle 514 is generally a land-based vehicle 514 capable of autonomous and/or semi-autonomous operation and having three or more wheels, e.g., a passenger car, light truck, etc. Although not shown in FIG. 5 for the sake of more efficient illustration, a system 110 included in vehicle 514, as discussed above concerning FIG. 1, can include one or more sensors 116, the V-to-I interface 118, the computing device 114 and one or more controllers 112. The sensors 116 may collect data related to the vehicle 514 and the environment in which the vehicle 514 is operating. By way of example, and not limitation, sensors 116 may include, e.g., altimeters, cameras, LIDAR, radar, ultrasonic sensors, infrared sensors, X-ray sensors, radio wave sensors, gamma ray sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the system 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles. The sensors 116 may further be used to collect data including dynamic vehicle 514 data related to operations of the vehicle 514 such as velocity, yaw rate, steering angle, engine speed, brake pressure, oil pressure, the power level applied to controllers 112 in the vehicle 514, connectivity between components, and accurate and timely performance of components of the vehicle.

Figure 2:
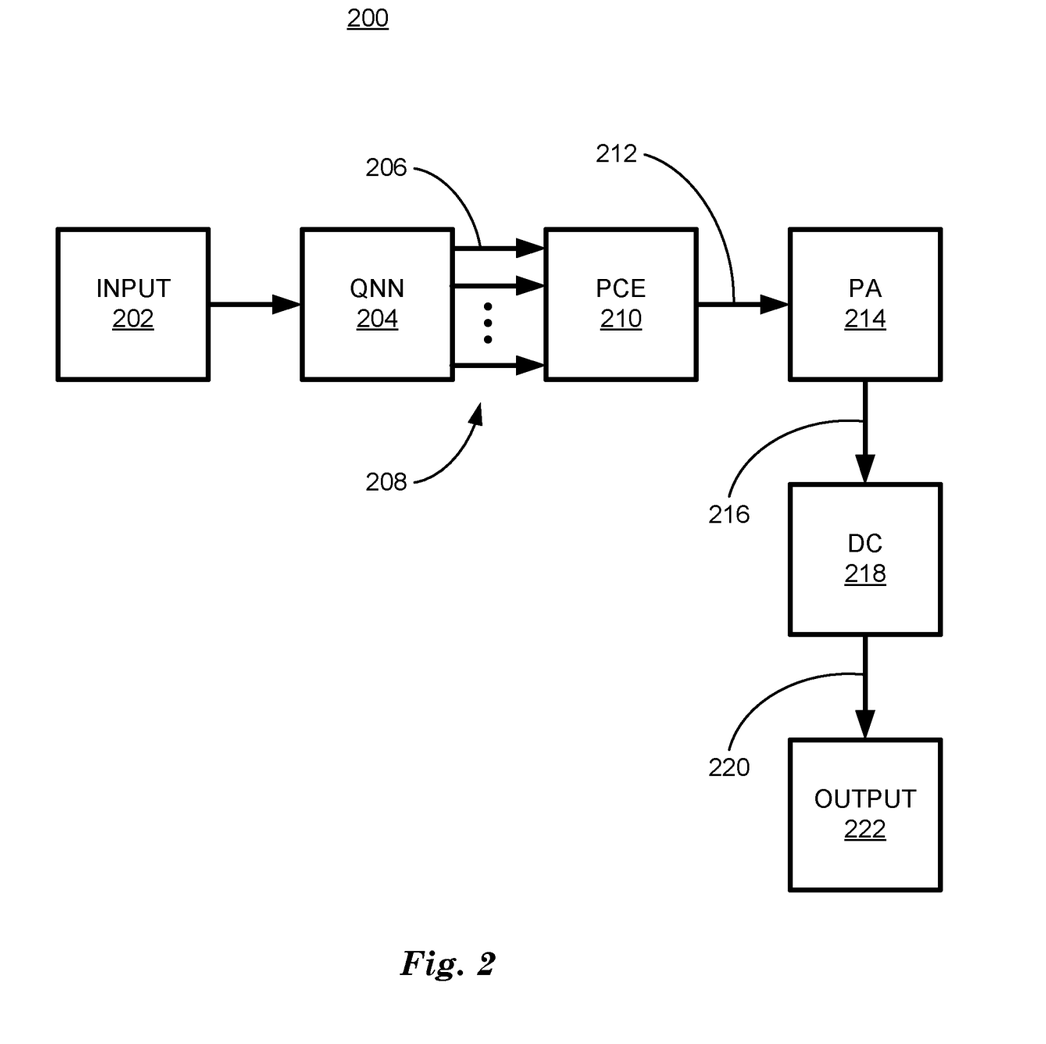
FIG. 2 is a diagram of an example quantile neural network system.

FIG. 2 is a diagram of a machine learning system 200. Machine learning system 200 includes input data (IN) 202 and a quantile neural network (QNN) 204. The quantile neural network 204 can include a plurality of convolutional layers and fully-connected layers that input data 202 and process the input data 202 to determine a prediction 206 and a plurality of uncertainties 208. Quantile neural network 600 can be implemented using the Keras deep learning API (github.com, Keras API special interest group). Keras is an application program interface (API) for the TensorFlow 2.0 open source machine learning platform available at tensorflow.org, written in the Python language and used to develop neural networking applications.

Prediction 206 is a prediction corresponding to the median quantile of a distribution of all output predictions produced by quantile neural network 204 in response to a training dataset that includes a plurality of input data 202. The input data 202 can be acquired by sensors 116 and is typically formatted as image data wherein pixel data is arranged in a rectangular array indexed using x, y coordinates. The input data 202 can be visible light or infrared camera data, lidar range data, ultrasound, X-ray, MRI, or gamma ray data and should include a range of variations that correspond to aleatoric and epistemic uncertainties to be expected in operation of the machine learning system 200. The uncertainties 208 are predictions corresponding to quantiles in the distribution of all output predictions expected from quantile neural network 204 in response to input data 202. Quantile neural network 204 is a process where input data 202 is a random variable X, input to a machine learning system 200 that includes a plurality of models {M1, M2, . . . , Mk}=M that produce a prediction 206 and a plurality of uncertainties 208. Random variables X can be assigned to group X1 corresponding to out-distribution examples and group X2 corresponding to in-distribution examples. Out-distribution examples are input data 202 for which machine learning system 200 can be expected to produce predictions with a low probability of being correct and in-distribution examples are input data 202 for which machine learning system 200 can be expected to produce predictions with a high probability of being correct. Group X1 corresponds to input data having high aleatoric uncertainty or high epistemic uncertainty. Group X2 corresponds to input data having low aleatoric uncertainty or low epistemic uncertainty.

Variables $Y_{M1}, Y_{M2}, \ldots, Y_{Mk}$ are outputs corresponding to prediction 206 and uncertainties 208 resulting from inputs X1 and X2 corresponding to input data 202 having been processed by quantile neural network 204 that includes models M1, M2, . . . , Mk. Training quantile neural network 204 includes training the models M1, M2, . . . , Mk included in machine learning system 200 to maximize the function:

$$\text{Max}(\text{Var}(Y_{M1}, Y_{M2}, \ldots, Y_{Mk})|X1) \quad (1)$$

Where Var( ) is the variance and |X1 conditions the Max function based on group X1, i.e., only predictions $Y_{Mi}$ resulting from inputs from X1 are included in the Max function. Training machine learning system 200 also includes training the models M1, M2, . . . , Mk to minimize the function:

$$\text{Min}(\text{Var}(Y_{M1}, Y_{M2}, \ldots, Y_{Mk})|X2) \quad (2)$$

Where Var( ) is again the variance and |X2 conditions the Min function based on group X2, i.e., only predictions $Y_{Mi}$ resulting from inputs from X2 are included in the Min function. Minimizing the variance of in-distribution (X2) results and maximizing the variance of out-distribution (X1) results permits the determination of a confidence value based on a distribution of prediction 206 and uncertainties 208 output in response to input data 202.

The prediction 206 and uncertainties 208 output by quantile neural network 204 are input to prediction confidence estimation (PCE) 210, which processes the prediction 206 and uncertainties 208 to a confidence level 212. Prediction confidence estimation 210 can determine a standard deviation of the distribution of the prediction 206 and the uncertainties 208 and can compare the standard deviation to a user determined threshold to determine a confidence level 212. The threshold can be determined based on processing a plurality of inputs and selecting a threshold that separates outputs that correspond to X1 inputs from outputs that correspond to X2 inputs. If the standard deviation of the prediction 206 and the uncertainties 208 is greater than or equal to the threshold, the confidence level 212 corresponding to prediction 206 is set equal to high uncertainty and if the standard deviation of the uncertainties is less than the threshold, the confidence level 212 corresponding to prediction 206 is set equal to low uncertainty.

The prediction 206 and confidence level 212 are input to a prediction arbitrator (PA) 214 which determines an acceptance/rejection flag 216 based on the prediction 206 and the confidence level 212. Prediction arbitrator 214 can be programmed to set the acceptance/rejection flag 216 equal to "accept" for all predictions 206 with a confidence level 212 equal to high confidence and to set the acceptance/rejection flag 216 equal to "reject" for all predictions 206 with a confidence level 212 equal to low confidence. In some examples, the prediction 206 can be compared to an expected range of values of predictions 206 and if the prediction 206 is outside an empirically determined expected range of values, the acceptance/rejection flag 216 can be set equal to "reject" even though the confidence level 212 can be high confidence. The prediction arbitrator 214 outputs the prediction 206 and an acceptance/rejection flag 216 to a decision controller (DC) 218 which, based on the acceptance/rejection flag either outputs (OUTPUT) 222 either the prediction 206 or a message indicating that no prediction will be output due to a "reject" value output from prediction arbitrator 214.

Figure 3:
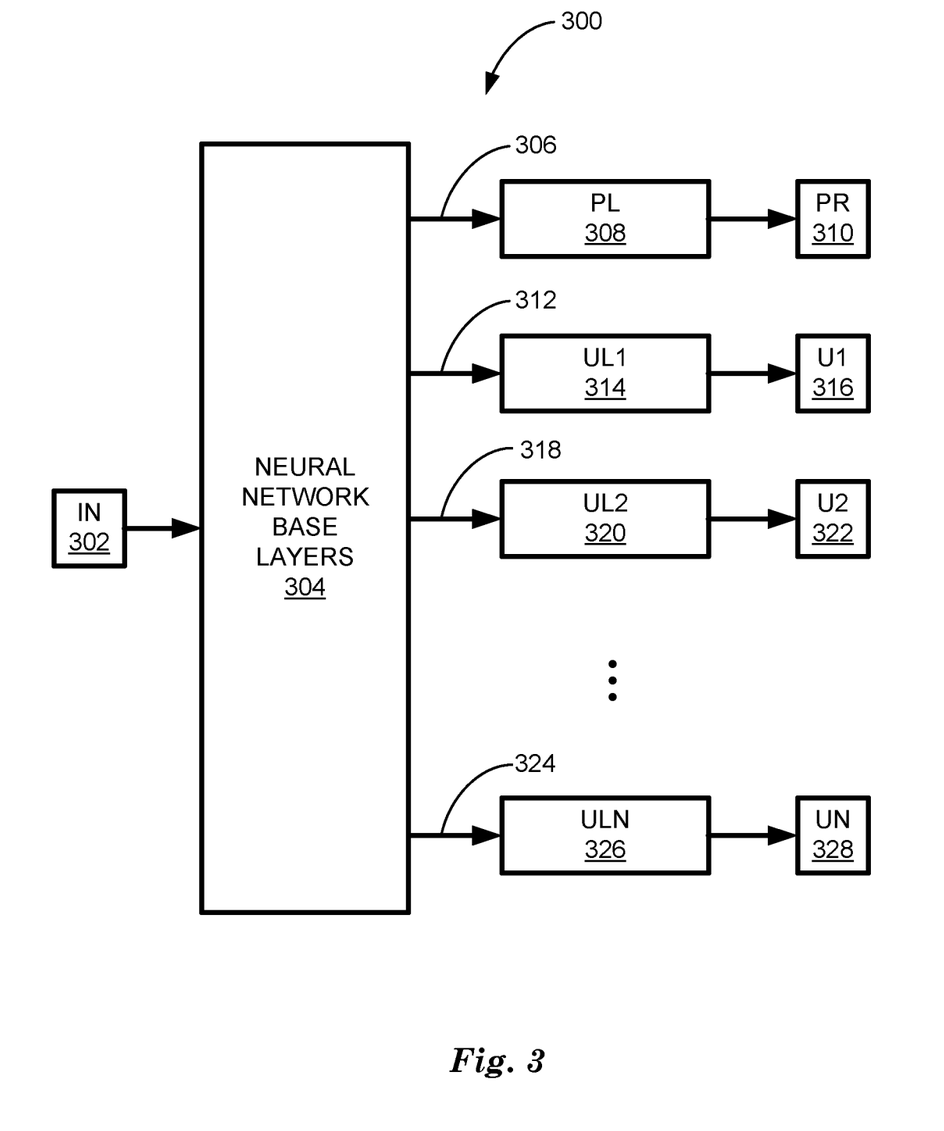
FIG. 3 is a diagram of an example quantile neural network.

FIG. 3 is a diagram of quantile neural network 300. Quantile neural network 300 inputs an image (IN) 302 and outputs a prediction (PR) 310 and a plurality of uncertainties (U1, U2, UN) 316, 322, 328. Quantile neural network 300 includes neural network base layers 304. Neural network base layers 304 include a plurality of convolutional layers that process an input image 302 provided by a sensor 116 and output hidden variables 306, 312, 318, 324 to prediction layer 308 and a plurality of uncertainty layers (UL1, UL2, ULN) 314, 320, 326. As discussed above, input image 302 can be a visible light image, an infrared light image, a lidar range image, a radar image, an ultrasound image, an X-ray image, or an MRI image, etc., acquired by a sensor 116. Prediction layer 308 and the uncertainty layers 314, 320, 326 are fully connected layers which, together with the neural network base layers 304 implement models M1, M2, ..., Mk as discussed above in relation to FIG. 2.

Prediction layer 308 and the uncertainty layers 314, 320, 326 correspond to quantile layers, wherein the output prediction 310 corresponds to the median quantile and uncertainties 316, 322, 328 correspond to quantiles that divide the probability distribution corresponding to outputs from the models M1, M2, ..., Mk into N quantiles each having an equal probability of occurring, both above and below the median quantile. Uncertainties layers 314, 320, 326 output uncertainties 316, 322, 328 that correspond to predictions above the median quantile will over predict, meaning that the uncertainties 316, 322, 328 corresponding to quantiles above the median will include a prediction that is larger than the median prediction. Uncertainty layers 314, 320, 326 output uncertainties 316, 322, 328 that correspond to predictions below the median quantile will under predict, meaning that the uncertainties 316, 322, 328 corresponding to quantiles below the median will include a prediction that is smaller than the median prediction. Prediction layer 308 outputs a prediction 310 corresponding to the median quantile, meaning that half of the predictions included in uncertainties 316, 322, 328 will include predictions that are larger than prediction 310 and half of the predictions included in uncertainties 316, 322, 328 will include predictions that are smaller than prediction 310. A confidence level 212 to be assigned to prediction 310 can be determined by measuring a variance of the predictions included in uncertainties 316, 322, 328. A measure of variance corresponding to the predictions included in uncertainties 316, 322, 328 is the standard deviation, which is the square root of the sum of the squared differences between the predictions included in uncertainties 316, 322, 328 and the mean of the predictions. The larger the standard deviation, the larger the uncertainty and therefore lower confidence in the prediction 310 corresponding to the median quantile output from quantile neural network 300 in response to input image 302. Likewise, smaller standard deviation corresponds to smaller uncertainty and therefore higher confidence in the predictions 310 corresponding to the median quantile output from quantile neural network 300 in response to input image 302.

Figure 4:
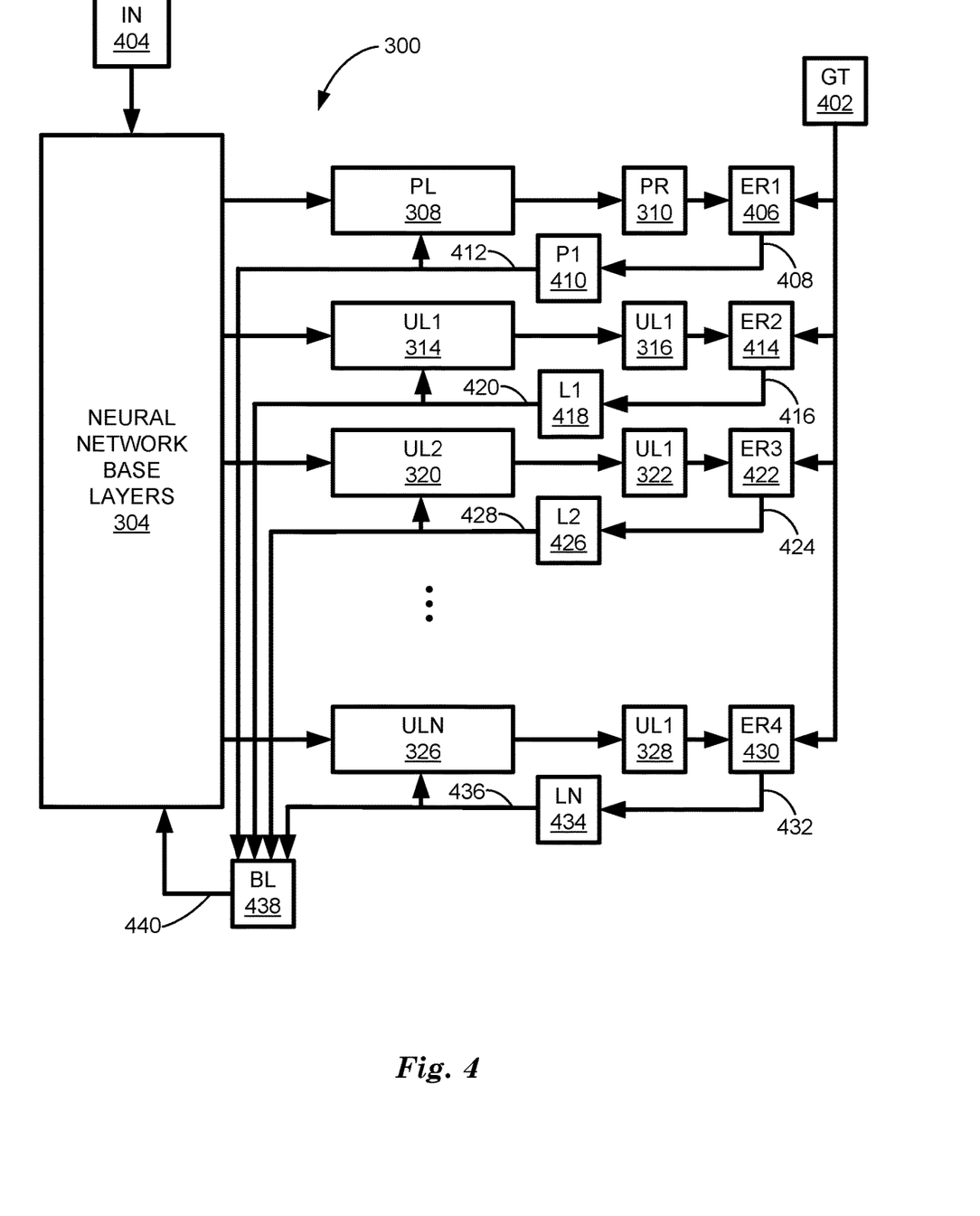
FIG. 4 is a diagram of example quantile neural network training.

FIG. 4 is a diagram of a quantile neural network 300 during training. A quantile neural network can be trained using ground truth (GT) 402. Ground truth is data corresponding to the results expected from processing an input image (IN) 404 with a quantile neural network 300, obtained from a source independent from the quantile neural network 300. As discussed above, input image 404 can be a visible light image, an infrared light image, a lidar range image, a radar image, an ultrasound image, an X-ray image, or an MRI image, etc., acquired by a sensor 116. For example, assume a quantile neural network 300 is being trained to locate objects in an image 404. The location of the object in an image 404 can be determined by measuring the location of the object in the image by a person using image processing software to measure pixel locations and relationships between portions of an image such as angles and distances. Object locations can also be measured in real world coordinates by a person observing the real world scene in the field of view of the sensor 116 that acquired the image.

Training a quantile neural network 300 includes error functions (ER1, ER2, ER3, ER4) 406, 414, 422, 430 that receive a prediction 310 and uncertainties 316, 322, 328 from the quantile neural network 300 and calculate respective error terms 408, 416, 424, 432. In this example the error terms 408, 416, 424, 432 can be an arithmetic difference between the predicted locations of an object and the measured location of the object from the ground truth 402. The error terms 408, 416, 424, 432 are passed to loss functions (P1, L1, L2, LN) 410, 418, 426, 434. Loss functions for prediction output 310 can be determined as mean squared error, where the loss functions 410, 418, 426, 434 can average squared differences over multiple values included in the location predictions. For example, the predictions can include x, y coordinates, a length and an angle measure applied to a trailer tongue. The differences between the predicted values and the measured values from the ground truth can be squared and averaged to arrive at a mean square error to be output by the loss functions 410, 418, 426, 434 as losses 412, 420, 428, 436. Prediction layer 308 is trained to output a prediction corresponding to a median quantile (MQ). The MQ minimizes the mean square error between the ground truth and the prediction.

Losses 412, 420, 428, 436 can be applied to prediction layer 308 and uncertainty layers 314, 320, 326, respectively, at training time to be used to adjust weights included in fully-connected neural network layers included in prediction layer 308 and uncertainty layers 314, 320, 326. At training time, loss functions 410, 418, 426, 434 form losses 412, 420, 428, 436 based on differences between the ground truth and quantile prediction values to train uncertainty layers 314, 320, 326 to produce quantile predictions corresponding to a distribution of predictions values as discussed below. Losses 412, 420, 428, 436 are also combined at base layer loss function 438 to produce a loss 440 that corresponds to feedback input to neural network base layers 304. Loss 440 applied to neural network base layers 304 where it is backpropagated through convolutional and fully-connected layers included in neural network base layers 304 to adjust weights that control the processing of input images 404.

Uncertainty layers 314, 320, 326 are trained to output predictions corresponding to a quantile of a distribution of prediction values. A distribution of prediction values can be determined by first determining an input dataset that corresponds to the distribution of aleatoric and epistemic uncertainties expected in the input data to be processed by the trained quantile neural network 300. For example, a dataset of input images 404 can be compiled that correspond to expected sources of image uncertainty, e.g., missing object, water on camera lens, underexposed image, overexposed image, motion blur, rain, snow, etc. A distribution of predictions can be determined by processing a dataset corresponding to the range of uncertainties in input images 404 and measuring the resulting distribution of output predictions.

Quantiles can be determined by dividing the distribution into portions where each portion includes an equal number of results. For example, assuming a normal distribution or predictions, three quantiles can be determined that divide the normal distribution into four segments. The first quantile is the 0.25 quantile and corresponds to the prediction at which 25% of the predictions in the distribution are less than the first quantile and 75% of the predictions are greater than the first quantile. The second quantile is the median quantile (MQ) and corresponds to the prediction where 50% of the predictions in the distribution are less than the second quantile and 50% of the predictions in the distribution are greater than the second quantile. The third quantile is the 0.75 quantile and corresponds to the prediction at which 75% of the predictions in the distribution are less than the third quantile and 25% of the predictions are greater than the third quantile.

The number of quantiles included in a quantile neural network 300 will depend upon the resolution in confidence values desired. In examples discussed herein, one prediction and two uncertainty predictions are output by a quantile neural network 300. The three output values are processed to determine a mean and a standard deviation. The standard deviation can be compared to a threshold to determine a high or low confidence level. In other examples, an greater number of quantiles can be included in a quantile neural network 300 to permit higher resolution statistics to be determined based on the output quantile values. With a greater number of quantiles, the standard deviation can be output without comparison with a threshold to correspond to a quantitative measure of confidence. For example, in medical imaging applications a quantitative measure of uncertainty can be more useful than a simple high or low confidence determination.

Quantile neural networks 300 are trained using a dataset that includes a plurality of input images 404 and corresponding ground truth 402. Each input image 404 is processed a plurality of times generating a plurality of losses 412, 420, 428, 436. The processing for a single input image 404 can iterate until the losses 412, 420, 428, 436 converge to a value that is less than a user-defined threshold. When the losses 412, 420, 428, 436 converge, the current values of the weights used to program the neural network base layers 304, prediction layers 308, and uncertainty layers 314, 320, 326 can be stored in memory. When all of the input images 404 are processed, a final set of weights can be determined by combining the weights for each input image 404. A process for training a quantile neural network 300 is discussed in relation to FIG. 7.

In addition to vehicle 514 operation as discussed herein, a machine learning system 200 including a quantile neural network 204 executing on a computing device 114 in a system 110 can be used for robot guidance, automated manufacturing, and medical imaging. In robot guidance, an object location prediction from a machine learning system 200 can be combined with a confidence level 212 to determine whether a robot arm can be instructed to move by computing device 114. If the object location prediction is labeled low confidence by machine learning system 200, computing device 114 can halt the robot's motion until further data is acquired and a high confidence prediction can be output by machine learning system 200. In an example where the machine learning system 200 is included in a medical imaging system, a prediction indicating that the machine learning system 200 has detected an anomaly in an X-ray or MRI image can be accompanied by a confidence level 212 that indicates whether the machine learning system 200 has high or low confidence in the prediction.

FIG. 5 is a diagram of an example arrangement of a vehicle 514 coupled to a vehicle trailer 500. A vehicle trailer 500 is a wheeled device attachable or couplable to a vehicle 514, and typically not independently powered (i.e., typically, the trailer 500 when coupled to a vehicle 514 moves when the vehicle 514, powered by the vehicle 514 propulsion, moves). Vehicle trailers 500 can include brakes and lights typically operating under control of the towing vehicle 514. FIG. 5 illustrates an application of a machine learning system 200 to vehicle 514 operation, namely vehicle trailer 500 backup assist. A vehicle trailer 500 can be attached to a vehicle 514 by attaching a trailer tongue 502 to the vehicle 514 at a hitch 504. A vehicle 514 centerline 506 joins a trailer centerline 508 at the hitch 504 to form a trailer angle 510. A sensor 116 including a camera 512 included in the vehicle 514 can acquire an image that includes the trailer tongue 502 and the hitch 504. The acquired image can be input 202 and processed with a machine learning system 200 to determine a trailer angle 510 and a confidence level 212 for determined trailer angle 510. The trailer angle 510 and confidence level 212 can be used by a computing device 114 in a vehicle 514 to determine control signals to communicate to vehicle 514 powertrain, braking and steering controllers 112 to while backing up a vehicle 514 with an attached vehicle trailer 500. A process for operating a vehicle 514 based on processing an image is discussed in relation to FIG. 8.

Figure 6:
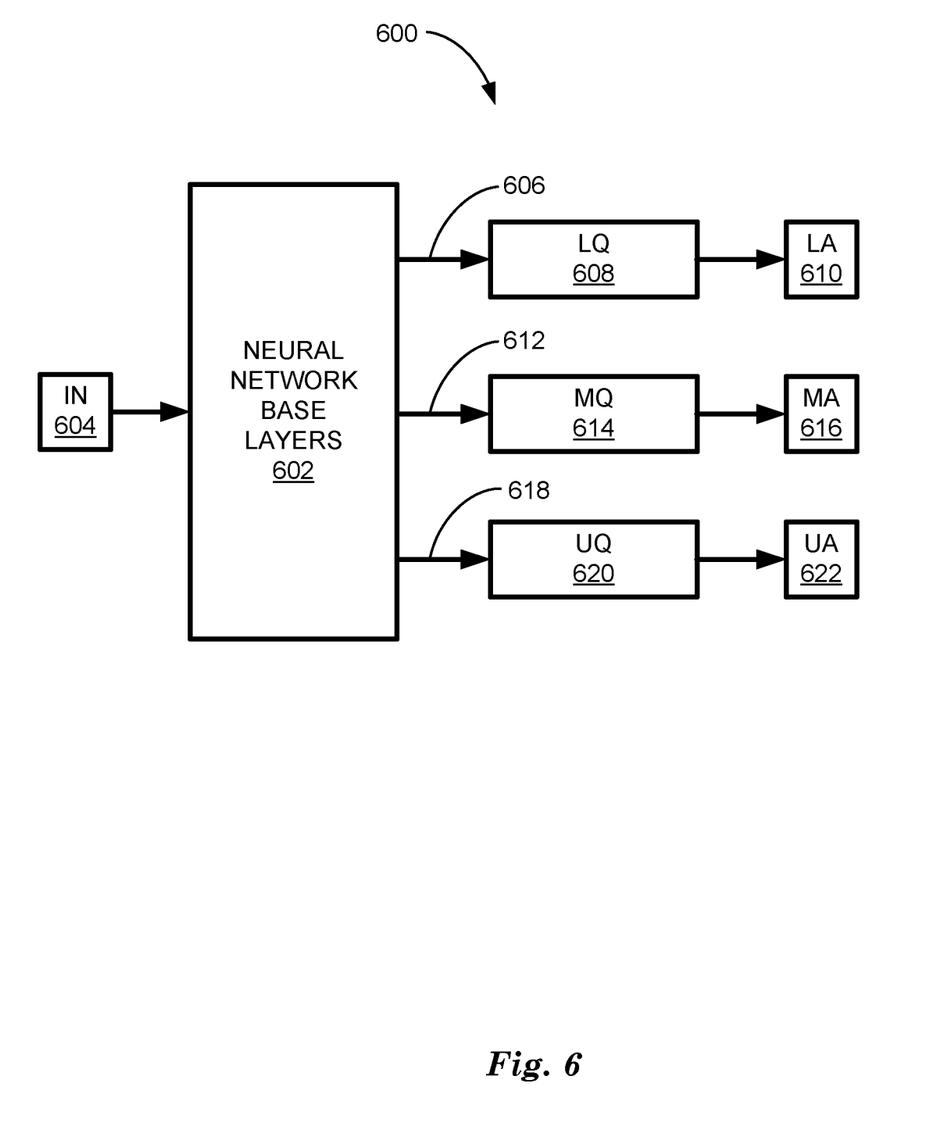
FIG. 6 is a diagram of a quantile neural network.

FIG. 6 is a diagram of a quantile neural network 600 that can be used for applications including vehicle 514 operation, robot guidance, and medical image processing, and in an example discussed herein, vehicle trailer 500 backup assist. Vehicle trailer 500 backup assist is an application where a sensor 116 included in a vehicle 514 can acquire an image 604 of a vehicle trailer 500 attached to a vehicle. The machine learning system 200 including a quantile neural network 600 can be included in a computing device 114 in a system 110 included in a vehicle. The quantile neural network 600 can input an image 604 that includes a vehicle trailer 500 attached to a vehicle 514 and predict a trailer angle 510 and a confidence level 212 corresponding to the trailer angle 510. Quantile neural network 600 includes neural network base layers 602 that include convolutional layers and fully connected layers that input an image 604 that can include a vehicle trailer 500 and output hidden variables 606, 612, 618. The hidden variables 606, 612, 618 are input by lower quantile (LQ) layers 608, mean quantile (MQ) layers 614, and upper quantile (UQ) layers 620, respectively. LQ layers 608, MQ layers 614, and UQ layers 620, output a lower quantile prediction (LA) 610, a mean square error prediction (MA) 616, and an upper quantile prediction (UA) 622, respectively.

Quantiles for quantile neural network 600 are determined by determining a distribution of the output predictions for all input images 604 in the training dataset used to train the quantile neural network 600 as discussed above in relation to FIG. 4. The lower quantile (LQ) angle prediction 610 is a trailer angle 510 prediction corresponding to the 0.25 quantile of the distribution of all trailer angle 510 predictions. The 0.25 quantile corresponds to an output angle prediction where 25% of all trailer angle 510 predictions are smaller than the LQ angle prediction and 75% of all the trailer angle 510 predictions are larger than the LQ angle prediction. The MQ angle prediction 616 corresponds to a trailer angle 510 prediction that occurs at the 0.5 percentile, or the median prediction value of all the trailer angle 510 predictions. The MQ angle prediction 616 corresponds to an output angle prediction where 50% of all trailer angle 510 predictions are smaller than the MQ angle prediction 616 and 50% of all trailer angle 510 predictions are larger than the MQ angle prediction 616. The upper quantile (UQ) angle prediction 622 corresponds to a 0.75 quantile trailer angle 510 prediction where 75% of all the trailer angle 510 predictions are smaller than the UQ angle prediction 622 and 25% of all the trailer angle 510 predictions are larger than the UQ angle prediction 622.

Quantile neural networks can be trained by determining loss functions for the MQ, LQ and UQ layers. The MQ loss function can be based on MQ error, which can be determined based the difference between the current prediction and a ground truth value. The loss function can be determined to minimize the mean square error (MQE), the mean absolute error (MAE), or based on Hinge loss, or Huber loss when the prediction corresponds to a regression problem. Hinge loss $\ell$ (y) applied to a prediction error y can be determined by the equation $$\ell(y)=\max(0,1-t\cdot y) \quad (3)$$

Where t=+1 or −1. Huber loss $L_\delta(y)$ applied to a prediction error y is determined by the equations $$L_\delta(y) = \begin{cases} \frac{1}{2}y^2 & \text{for } |y| \le \delta \\ \delta\left(|y| - \frac{1}{2}\delta\right) & \text{otherwise} \end{cases} \quad (4)$$

Where $\delta$ is the standard deviation of the prediction error. When the quantile neural network is used to determine a classification problem, cross-entropy or logarithmic loss functions can be used. The MQ layers can trained with a combination of loss functions from both regression and classification. The LQ and UQ loss functions can be determined based on LQ error and UQ error functions defined by:

$$LQerror = \max\begin{pmatrix} LQ*(\log(l1+l2*)), \\ (LQ-1)*(\log(l1+l2*\exp\{l3*MQerror\})) \end{pmatrix} \quad (5)$$

$$UQerror = \max\begin{pmatrix} UQ*(\log(u1+u2*\exp\{u3*MQerror\})), \\ (UQ-1)*(\log(u1+u2*\exp\{u3*MQerror\})) \end{pmatrix} \quad (6)$$

Where LQ, UQ, l1, l2, l3, u1, u2, and u3 are user-determined constants.

The MQ angle prediction 616 is output as the predicted trailer angle 510. The MQ angle prediction 616, the upper quantile angle prediction 622 and the lower quantile angle prediction 610 are used to determine a confidence level 212 for the MQ angle prediction 616. Referring back to FIG. 2 The MQ angle prediction 616, the upper quantile angle prediction 622 and the lower quantile angle prediction 610 are input to a prediction confidence estimation 210 block to determine a confidence level 212. A confidence level 212 can be determined by calculating a standard deviation based on a distribution formed by the MQ angle prediction 616, the upper quantile angle prediction 622 and the lower quantile angle prediction 610. The higher the standard deviation, the greater the dispersion in the distribution and therefore more uncertainty in the MQ angle prediction 616. The uncertainty can be measured by comparing the standard deviation to an empirically determined threshold. If the standard deviation is greater than the threshold, the MQ angle prediction 616 is determined to have low confidence and if the standard deviation is less than the threshold the MQ angle prediction 616 is determined to have high confidence.

Quantile neural network 600 can be trained to determine prediction for a trailer angle 510 and uncertainties corresponding to the trailer angle 510 using techniques described in relation to FIG. 4, above. The base layer loss function 438 that determines base layer loss 440 from the loss functions for the prediction and uncertainty layers can be calculated as:

base layer loss=a*(MQ loss)+b*(LQL loss)+c*(UQL loss) (7)

Where MQ loss, LQL loss and UQL loss are the loss functions for the MQ layers 614, the lower quantile layers 608 and the upper quantile layers 620, respectively. The base layer loss 440 can be applied to base layers 304 to determine base layer weights. The values a, b, and c can be user selected constants. In the example illustrated in FIG. 6, a=b=c=1.

As discussed above, a trained quantile neural network 600 can detect low confidence conditions due to both aleatoric and epistemic uncertainties. Other techniques for determining uncertainties in trailer angle 510 prediction, including post-processing using Kalman filters and multi-model techniques using dropout deep neural networks, can perform as well as a quantile neural network 600 in examples where the vehicle trailer 500, trailer tongue 502 and hitch 504 are clearly visible. In examples where aspects of the vehicle trailer 500 including the trailer tongue 502 or the hitch 504 are obscured, a quantile neural network 600 can outperform post processing based neural networks including Kalman filters and multiple model neural networks including dropout deep neural networks. Examples of images where aspects of the vehicle trailer 500 are obscured include images in which no vehicle trailer 500 is visible, images where the camera lens is obscured by water droplets on the lens, or images that are underexposed (too dark) or overexposed (too light). In addition, quantile neural networks 600 improve upon post processing based neural networks including Kalman filters and multiple model neural networks including dropout deep neural networks by requiring fewer computing resources including memory and less processing time.

Figure 7:
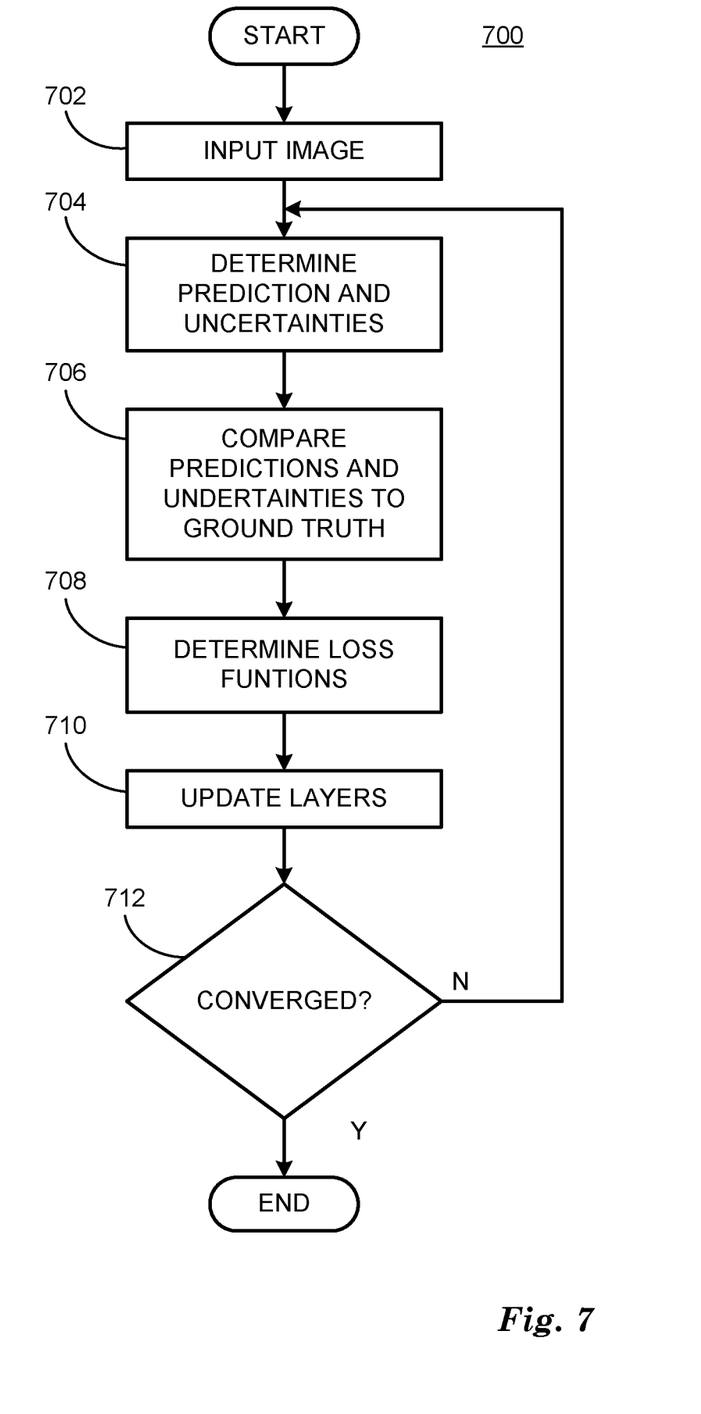
FIG. 7 is a flowchart diagram of an example process to train a quantile neural network.

FIG. 7 is a diagram of a flowchart, described in relation to FIGS. 1-6, of a process for training a quantile neural network 300 as discussed in relation to FIG. 4, above. Process 700 can be implemented by a processor of a computing device 114 or server computer 120 taking as input data from sensors 116. Following training of quantile network 300 on a server computer 120, the trained quantile neural network 300 can be downloaded to a computing device 114 included in a vehicle 514. In other examples, a trained quantile network 300 can be downloaded to a computing device 114 for use in or with a robot, a manufacturing device or medical scanner, for example. Process 700 includes multiple blocks that can be executed in the illustrated order. Process 700 could alternatively or additionally include fewer blocks or can include the blocks executed in different orders.

Process 700 begins at block 702, where an image 404 acquired by a sensor 116 is input to a quantile neural network 300 executing on a computing device 114 or server computer 120, for example. The image 404 is part of a training dataset where a plurality of images 404 include corresponding ground truth 402. The training dataset can include one thousand images 404 or more, for example.

At block 704 an image 404 is processed by the quantile neural network 300 to determine a prediction 310 corresponding to the median quantile and one or more uncertainty 316, 322, 328 predictions corresponding to quantiles of the distribution of predictions produced by the quantile neural network 300. The number of quantiles used to determine uncertainty 316, 322, 328 predictions can be determined based on the desired resolution in confidence output of the quantile neural network 300, as explained above. The more quantiles used, the greater resolution in confidence output by the quantile neural network 300.

At block 706 the output prediction 310 and uncertainty 316, 322, 328 predictions are compared to ground truth 402 to determine differences between the predictions and the ground truth as discussed above in relation to FIG. 4.

At block 708 the computing device 114 or server computer 120 determines losses 412, 420, 428, 436 for each of the prediction layer 308 and uncertainty layers 314, 320, 326, and combines the loss functions to determine a base layer loss 440 for the neural network base layers 304. The losses 412, 420, 428, 436, 440 are input to the prediction layer 308, the uncertainty layers 314, 320, 326 and the neural network base layers 304.

At block 710 the losses are backpropagated through the prediction layer 308, the uncertainty layers 314, 320, 326 and the neural network base layers 304 to determine updated weights as discussed in relation to FIG. 4, above.

At block 712 the losses 412, 420, 428, 436, 440 are compared to previously determined losses 412, 420, 428, 436, 440 to determine if the training of quantile neural network 300 is converging. Training of quantile neural network 300 is determined to be converging when the current losses 412, 420, 428, 436, 440 differ from previously determined losses 412, 420, 428, 436, 440 by less than an empirically determined amount. If the training has not converged, process 700 passes back to block 704 where a prediction 310 and uncertainty 316, 322, 328 predictions are determined based on the updated weights. If the training has converged, the weights are stored by computing device 114 or server computer 120 to be combined with weights determined based on the other images 404 in the training dataset. In examples where the quantile neural network 300 is trained on a server computer 120, the trained neural network 300 can be downloaded to a computing device 114. Following block 712 process 700 ends.

Figure 8:
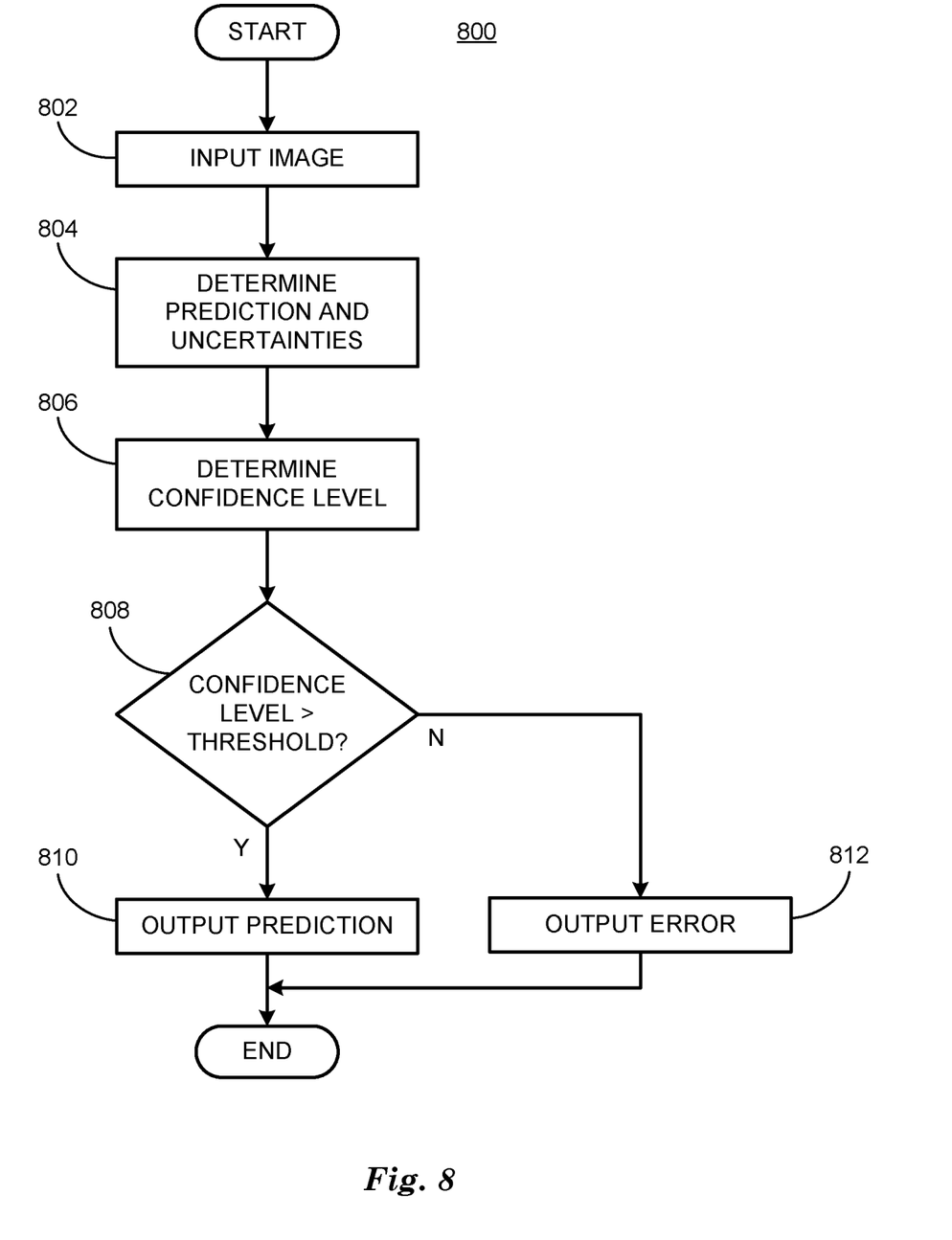
FIG. 8 is a flowchart diagram of an example process to operate a vehicle, machine or device based on a quantile neural network.

FIG. 8 is a diagram of a flowchart, described in relation to FIGS. 1-6, of a process for operating a vehicle 514 based on processing image data with a machine learning system 200. The machine learning system 200 can determine a trailer angle 510 and a confidence level 212 as discussed above in relation to FIG. 5. Process 800 can be implemented by a processor of computing device, taking as input data from sensors 116, and executing commands, and outputting object data, for example. Process 800 includes multiple blocks that can be executed in the illustrated order. Process 800 could alternatively or additionally include fewer blocks or can include the blocks executed in different orders.

Process 800 begins at block 802, where an image acquired by sensor 116 that includes a vehicle trailer 500 is input 202 to a machine learning system 200. The machine learning system 200 has been trained using techniques discussed in relation to FIG. 4, to determine a trailer angle 510 and uncertainties corresponding to the trailer angle 510.

At block 804 the machine learning system 200 determines a MQ angle prediction 616, a lower quantile angle prediction 610 and an upper quantile angle prediction 622 as discussed above in relation to FIG. 6.

At block 806 the machine learning system 200 determines a confidence level 212 based on determining the standard deviation of the MQ angle prediction 616, the lower quantile angle prediction 610 and the upper quantile angle prediction 622.

At block 808 the standard deviation determined at block 806 is compared to a threshold to determine whether the MQ angle prediction 616 is high confidence or low confidence. If the result of the comparison is high confidence, an acceptance/rejection flag 216 can be set equal to "accept" and process 800 passes to block 810. If the result of the comparison is low confidence, an acceptance/rejection flag 216 can be set equal to "reject" and process 800 passes to block 812.

At block 810 the high confidence MQ angle prediction 616 and "accept" flag can be communicated to a process in a computing device 114 for operating a vehicle. For example, the MQ angle prediction 616 can be used to determine control signals to be communicated to controllers 112 to control vehicle powertrain, vehicle brakes and vehicle steering to back up a vehicle 514 with a vehicle trailer 500 attached. By determining a trailer angle 510, the vehicle 514 can be operated so as to cause the vehicle trailer 500 to move to a desired location, such as a parking spot. The MQ prediction can also be communicated to one or more of a vehicle diagnostics module, a vehicle analytics module, and a vehicle data-collection module. Following block 810 process 800 ends.

At block 812 the low confidence MQ angle prediction and "reject" flag can be communicated to a process in computing device 114. Computing device 114 will not operate vehicle 514 based on the low confidence MQ angle prediction, for example. Following block 812 process 800 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
train a quantile neural network to input an image and output a lower quantile (LQ) prediction, a median quantile (MQ) prediction and an upper quantile (UQ) prediction corresponding to an object in the image, wherein an LQ loss, an MQ loss and a UQ loss are determined for the LQ prediction, the MQ prediction and the UQ prediction respectively and wherein the LQ loss, the MQ loss and the UQ loss are combined to form a base layer loss; and
output the quantile neural network.

2. The computer of claim 1, wherein the LQ prediction corresponds to a first quantile included in a distribution of output predictions, the MQ prediction corresponds to a second quantile included in the distribution of output predictions and the UQ prediction corresponds to a third quantile included in the distribution of output predictions.

3. The computer of claim 1, the instructions including further instructions to determine the LQ loss, the MQ loss and the UQ loss by comparing the LQ prediction, the MQ prediction, and the UQ prediction, respectively to a ground truth value determined based on the image.

4. The computer of claim 3, the instructions including further instructions to apply the LQ loss to LQ layers of the quantile neural network, apply the MQ loss to MQ layers of the quantile neural network and apply the UQ loss to UQ layers of the quantile neural network.

5. The computer of claim 1, the instructions including further instructions to determine the base layer loss by combining the LQ loss, the MQ loss, and the UQ loss corresponding to a base layer loss function wherein the base layer loss function=a*(LQ loss)+b*(MQ loss)+c*(UQ loss), wherein a, b, and c are user selected constants.

6. The computer of claim 5, wherein the base layer loss function is applied to base layers of the quantile neural network including convolutional layers and fully connected layers.

7. The computer of claim 1, the instructions including further instructions to determine a confidence level by comparing a standard deviation of the LQ prediction, the MQ prediction, and the UQ prediction to a user determined threshold.

8. The computer of claim 7, wherein the quantile neural network is output to a computing device in a vehicle.

9. The computer of claim 8, the instructions including further instructions to operate the vehicle based on inputting image data to the quantile neural network and receiving an output prediction corresponding to the MQ prediction and the confidence level.

10. The computer of claim 9, the instructions including further instructions to operate the vehicle by communicating control signals to one or more of a vehicle powertrain controller, a vehicle braking controller, and a vehicle steering controller.

11. A method comprising:
training a quantile neural network to input an image and output a lower quantile (LQ) prediction, a median quantile (MQ) prediction and an upper quantile (UQ) prediction corresponding to an object in the image, wherein an LQ loss, an MQ loss and a UQ loss are determined for the LQ prediction, the MQ prediction and the UQ prediction respectively and wherein the LQ loss, the MQ loss and the UQ loss are combined to form a base layer loss; and
outputting the quantile neural network.

12. The method of claim 11, wherein the LQ prediction corresponds to a first quantile included in a distribution of output predictions, the MQ prediction corresponds to a second quantile included in the distribution of output predictions and the UQ prediction corresponds to a third quantile included in the distribution of output predictions.

13. The method of claim 11, further comprising determining the LQ loss, the MQ loss and the UQ loss by comparing the LQ prediction, the MQ prediction, and the UQ prediction, respectively to a ground truth value determined based on the image.

14. The method of claim 13, further comprising applying the LQ loss to LQ layers of the quantile neural network, applying the MQ loss to MQ layers of the quantile neural network and applying the UQ loss to UQ layers of the quantile neural network.

15. The method of claim 11, further comprising determining the base layer loss by combining the LQ loss, the MQ loss, and the UQ loss corresponding to a base layer loss function wherein the base layer loss function=a*(LQ loss)+b*(MQ loss)+c*(UQ loss), wherein a, b, and c are user selected constants.

16. The method of claim 15, wherein the base layer loss function is applied to base layers of the quantile neural network including convolutional layers and fully connected layers.

17. The method of claim 11, further comprising determining a confidence level by comparing a standard deviation of the LQ prediction, the MQ prediction, and the UQ prediction to a user determined threshold.

18. The method of claim 17, wherein the quantile neural network is output to a computing device in a vehicle.

19. The method of claim 18, further comprising operating the vehicle based on inputting image data to the quantile neural network and receiving an output prediction corresponding to the MQ prediction and the confidence level.

20. The method of claim 19, further comprising operating the vehicle by communicating control signals to one or more of a vehicle powertrain controller, a vehicle braking controller, a vehicle steering controller, vehicle diagnostics module, a vehicle analytics module and a vehicle data-collection module.

* * * * *